May 1, 1956     P. B. WICKHAM     2,743,603
APPARATUS FOR TESTING TIMERS OR THE LIKE
Filed Sept. 13, 1952     2 Sheets-Sheet 1
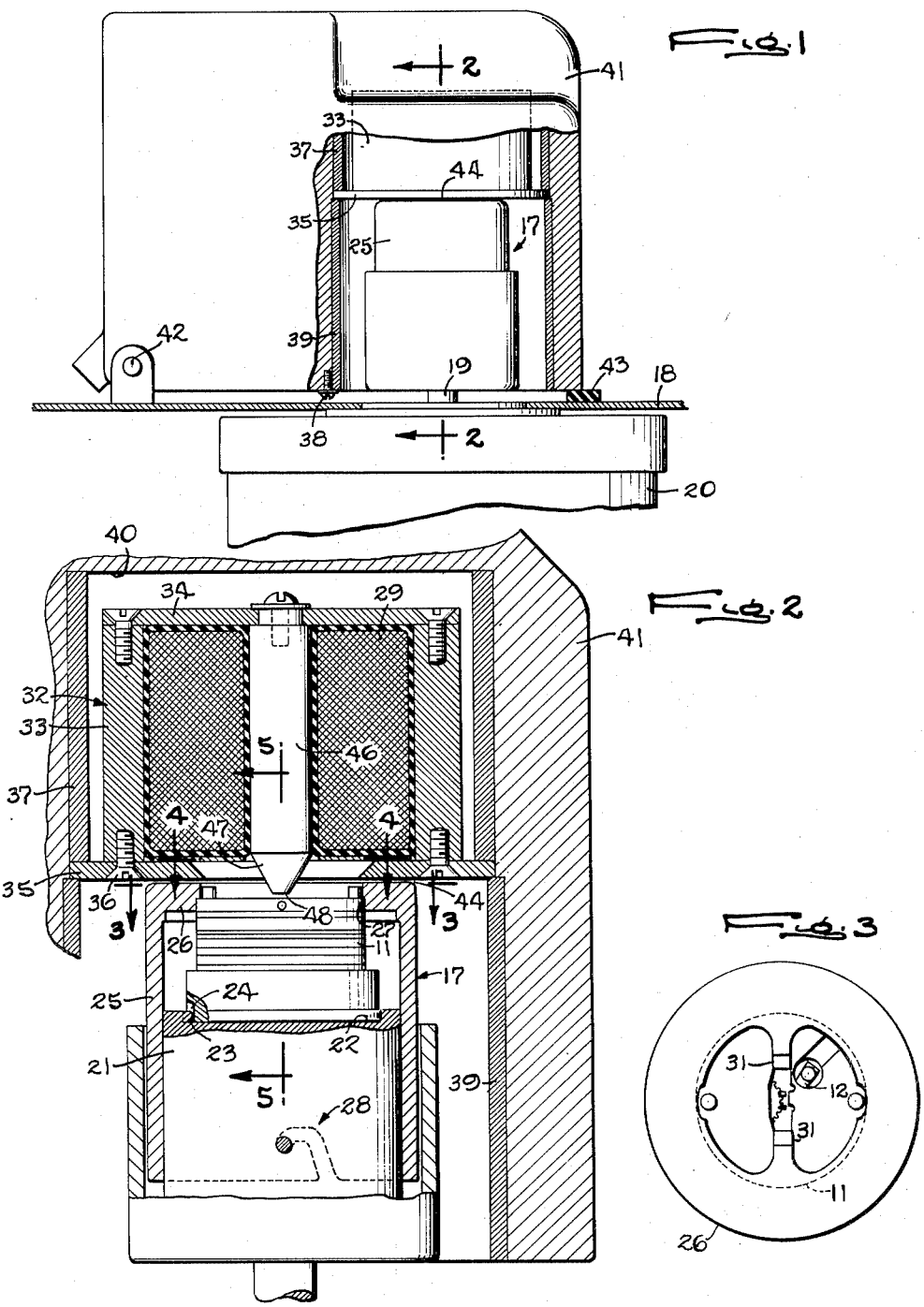
INVENTOR
Parker B. Wickham
By Carlson, Pitzner, Hubbard, Wolf
ATTORNEY May 1, 1956 P. B. WICKHAM 2,743,603
APPARATUS FOR TESTING TIMERS OR THE LIKE
Filed Sept. 13, 1952 2 Sheets-Sheet 2
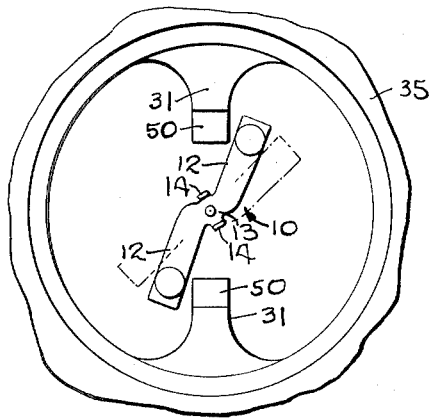
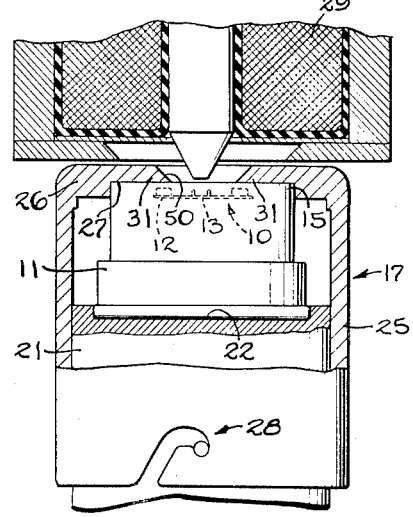
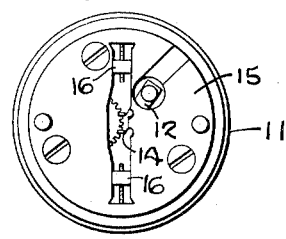
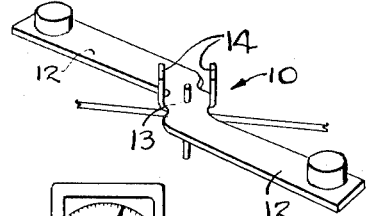
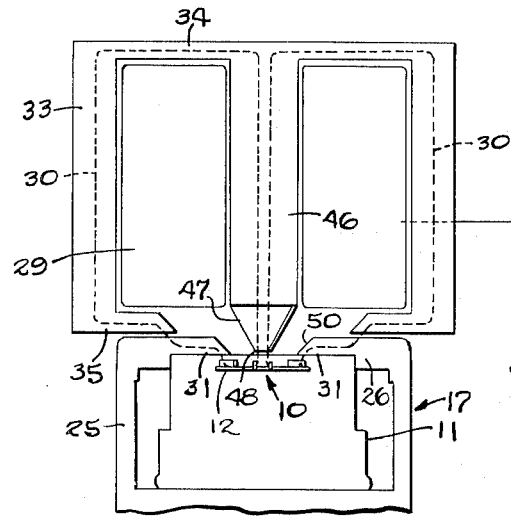
INVENTOR
Parker B. Wickham
ATTORNEYS United States Patent Office 2,743,603
Patented May 1, 1956

2,743,603

APPARATUS FOR TESTING TIMERS OR THE LIKE

Parker B. Wickham, Janesville, Wis., assignor to Gibbs Manufacturing and Research Corporation, Janesville, Wis., a corporation of Wisconsin Application September 13, 1952, Serial No. 309,487

10 Claims. (Cl. 73—5)

This invention relates generally to apparatus for measuring the rate of movement of a part relative to a carrier while the latter is moving, one example of such a device being a fuze having a carrier or support and a clock mechanism thereon including an element which oscillates back and forth at a frequency determined by the adjustment of said mechanism. The invention is particularly concerned with apparatus for determining the frequency of oscillation of the element while its carrier is turning at high speed.

One object is to provide an apparatus of the above character which is responsive to changes in the reluctance of a magnetic path extending through the element and parts of the carrier and variable with changes in the position of the element relative to the carrier.

Another object is to extend the magnetic path through a gap defined by rotary and nonrotatable parts and remaining of substantially uniform reluctance in all of the different positions of the carrier about its rotational axis.

A further object is to detect changes in the frequency of the oscillatory element through the use of a magnetic circuit of the above character without danger of magnetizing the element or the associated parts of the clock mechanism.

Other objects and advantages of the invention will become apparent from the following detailed description taken in connection with the accompanying drawings, in which Figure 1 is a fragmentary side elevational view of a timer checking apparatus embodying the novel features of the present invention, part of the casing being broken away and shown in section, Fig. 2 is an enlarged fragmentary cross sectional view taken along the line 2—2 of Fig. 1;

Figs. 3, 4, and 5 are fragmentary sectional views taken respectively along the lines 3—3, 4—4, and 5—5 of Fig. 2;

Fig. 6 is a top view of the fuze body;

Fig. 7 is a perspective view of the pallet lever; and

Fig. 8 is a diagrammatic view showing the magnetic flux circuits.

The improved apparatus in the form shown in the drawings is especially adapted for measuring the frequency of oscillation of a pallet lever 10 which is oscillated by a clock mechanism disposed within a generally cylindrical carrier or fuze support body 11 of non-magnetic material and well known construction. The pallet lever comprises arms 12 projecting outwardly from a hub 13 carrying pallet lugs 14 which coact with the escapement wheel of the clock mechanism. The hub 13 is supported near one end wall 15 of the fuze body and pivoted to swing or oscillate about the axis of the fuze body between the positions shown respectively in full and dot-dash lines in Fig. 4. In fuze constructions of this character the effective length of the balance spring which furnishes power for driving the pallet lever is varied by changing the positions of anchors 16 (Fig. 6).

While the fuze is being tested, the body 11 is supported by and clamped in a chuck 17 disposed above a table 18, the chuck extending from a vertically disposed shaft 19 of an electric motor 20 secured to the underside of the table. The chuck comprises a cylindrical support 21 connected with the shaft 19 and having a top recess 22 adapted to receive the bottom or lower end of the fuze body and to dispose the latter accurately with its axis coinciding with the axis of the shaft. A lug 23 (Fig. 2) projecting into a notch 24 in the fuze body locates the range of oscillation of the pallet lever 10 in a definite angular position relative to the chuck.

An inverted cylindrical cup 25 constituting part of the chuck fits over the fuze and has a radially inwardly extending flange 26 shouldered at 27 to telescope closely over and abut against the upper end of the fuze body. Angularly spaced bayonet connections 28 are utilized to secure the cup 25 on the support 21 with the fuze body firmly clamped between the flange 26 and the recess 22.

In accordance with the present invention, voltage changes readily detectable by well known circuits are produced in a stationary coil 29 and associated with one or more magnetic flux circuits 30 (Fig. 8) the reluctance of which is affected by movement of the pallet lever 10 relative to the carrier 11 but is not changed appreciably by movement of the carrier being tested. The flux circuit includes at least a part of the pallet lever 10 and also a rotatable part on the carrier cooperating with a stationary part to form an air gap which remains of substantially uniform reluctance for all positions of the carrier. In the present instance, the rotatable part of the magnetic flux circuit includes the annular outer peripheral portion of the chuck flange 26 and two diametrically oppositely disposed teeth 31 projecting radially inwardly therefrom and terminating in bevelled squared end 50 which lie in the plane of the flange and are disposed at a smaller radius than the outer ends of the arms 12 of the parallel lever.

While the teeth 31/50 may overlap the arms 12 anywhere within the range of oscillation of the pallet, they are disposed in the present instance a short distance outwardly beyond one extremity of this range as shown in full lines in Fig. 4. This arrangement is preferred in order to obtain maximum variations in the reluctance of the flux circuit as the pallet moves back and forth. If it is desired to double the frequency of impulses sensed by the apparatus, the teeth 31/50 would be located along the median position of the pallet, the reluctance of the flux circuit then being increased as the pallet swings in either direction away from this median position.

The stationary part of the flux circuit is formed by a shell or casing 32 of magnetic material such as soft iron mounted above the chuck concentric with the axis thereof and enclosing the coil 29. This shell comprises a tubular sleeve portion 33, a disk 34 secured to and closing the upper end of the sleeve, and a centrally apertured plate 35 secured by screws 36 to the lower end of the sleeve. The plate 35 is larger in diameter than the sleeve 33 and its outer peripheral margin is clamped between a shoulder formed by a tubular spacer 37 and a tubular spacer 39. The clamping force is produced by screws 38 acting on the spacer 39 (Fig. 1).

The casing or shell 32 is disposed in a recess 40 in a casting 41 which also forms a removable guard or hood around the chuck. The casting is fulcrumed at 42 and may be swung upwardly and laterally to expose the top of the chuck and permit ready insertion of the fuze to be tested.

When the hood 41 is swung downwardly against a stop 43 (Fig. 1), into the position as shown in Figs. 1 and 2, the inner flange like portion of the plate 35 will be disposed close to the chuck flange and spaced therefrom by a narrow gap 44. Since one, or in this instance both, of the opposed surfaces of these parts is continuous, the reluctance of the annular gap 44 remains constant for all angular positions of the chuck and the fuse being tested.

For a purpose to appear presently, the coil 29 is composed of a large number of turns, for example several thousand turns, wound to form an annular body which fits closely within and substantially fills the shell or casing 32. A magnetic core 46 extends through the coil along the chuck axis and at its upper end abuts against and is secured rigidly to the center of the disk 34. The lower end portion of the core projects through the coil and the hole in the plate 35 and tapers as indicated at 47 to a flat circular end 48 of small diameter disposed close to the upper end of the fuze body and opposite the central portion or hub 13 of the pallet lever 10. The gap between the lever and the end of the core is concentric with the chuck axis and thus, like the outer or annular gap 44, remains of constant reluctance in all of the different angular positions of the chuck. The taper 47 on the core 46 substantially parallels the bevels 50 (Fig. 5) on the inner ends of the teeth 31 so that the two are separated by a substantially greater width than the space between the pallet lever and the teeth 31.

When a fuze to be tested is clamped in the chuck and the hood 41 is swung down to operating position, the magnetic parts above described cooperate to form the flux circuits 30 (Fig. 8) of relatively low reluctance extending through the center of the coil and through the pallet lever 10 between the teeth 31 and the core end 48. Each circuit is of minimum reluctance when the lever is disposed closest to the teeth as shown in full lines in Fig. 4. As the lever swings clockwise away from this limit position, the reluctance of the magnetic circuit increases progressively and reaches a maximum in the other limit position of the pallet shown in dot-dash lines in Fig. 4.

These circuits are threaded by magnetic flux which is of extremely low density in order to avoid magnetization of the lever 10 or associated parts of the fuze. While this flux may be derived from a separate energy source, it has been found that magnetic parts constructed in the manner above described retain sufficient residual magnetism to provide detectable voltage changes in the coil 29.

It will be apparent that as the pallet lever 10 moves back and forth to change the reluctance of the magnetic circuits above described, the flux density will be varied correspondingly thus inducing in the winding 29 a voltage which varies with the position of the pallet lever. Because of the large number of turns in the winding, the voltage generated is of sufficient magnitude to be readily measurable. The total change, which may be on the order of .003 of a volt, may be amplified and sensed by apparatus 51 well known in the art such for example as a Type 1176–A frequency meter manufactured by General Radio Company.

To test the timer of a fuze, the hood 41 is swung into open position after which the bayonet connections 28 are released to permit removal of the chuck cup 17. The fuze body is inserted and seated in the chuck and the cup is replaced thus bringing the teeth 31 and the range of oscillation of the pallet lever into the relation shown in Fig. 4. With the fuze thus clamped securely in the chuck, the motor 20 is started, oscillation of the pallet lever starting automatically when the chuck has attained the proper speed. Through the magnetic and electrical mechanism described above, the frequency of the oscillation is indicated on the meter 51.

By utilizing the movements of the oscillating element or pallet lever 10 to vary the reluctance of a magnetic circuit, the frequency of oscillation of the element may be determined readily by means of sensing apparatus of reliable and durable construction and without objectionable variation of the signals as an incident to high speed rotation of the fuze body. While the magnetic circuit is well defined within the rotatable and nonrotatable parts, it need not be fully isolated from other magnetic circuits and as a result the chuck and the magnet core may be of simple and relatively inexpensive construction.

Changes may be made within the scope and spirit of the appended claims which define what is believed to be new and desired to have protected by Letters Patent.

I claim as my invention:

1. Apparatus for testing a fuze having a generally cylindrical carrier and a magnetic angularly oscillatable pallet element having a hub and arms extending therefrom with said hub mounted on said carrier near one end thereof to oscillate back and forth about the axis of said carrier, said apparatus including a chuck comprising a tubular housing for receiving and enclosing said carrier and forming at one end thereof an annular radially inwardly extending magnetic flange disposed adjacent the pallet end of said carrier, a pair of teeth extending from said flange radially inwardly thereof, the outer ends of the arms of said pallet element oscillating toward and away from said teeth, means for rotating said chuck about the axis of said carrier enclosed thereby, a stationary magnet structure positioned adjacent said radially inwardly extending flange of said chuck with its axis paralleling the chuck axis, said magnet structure comprising a magnetic casing and a coil disposed therein, said casing forming at one end thereof a flange extending in parallel with said chuck flange and spaced therefrom by a narrow gap, a magnetic core extending along said chuck axis through said coil and terminating adjacent the hub of said pallet element, said core being spaced radially from said teeth and forming therewith and with said flanges and said magnetic casing a magnetic flux circuit, the reluctance of said flux circuit being varied by the oscillation of said pallet element relative to said teeth, and means responsive to the variation of said reluctance for indicating the frequency of oscillation of said pallet element.

2. Apparatus for testing a fuze having a generally cylindrical carrier and a magnetic angularly oscillatable pallet element having a hub and arms extending therefrom with said hub mounted on said carrier near one end thereof to oscillate back and forth about the axis of said carrier, said apparatus including a chuck for receiving and holding said carrier with said pallet element thereon, means for rotating said chuck and said carrier held thereby about the axis of said carrier, a magnetic member on said chuck disposed adjacent the pallet end of said carrier, a pair of teeth extending from said magnetic member, said teeth being spaced from the chuck axis with the ends thereof lying adjacent the path of oscillation of the outer ends of the arms of said pallet element, a second stationary magnetic member disposed adjacent said first-named magnetic member and cooperating therewith to form a narrow gap of a reluctance which remains substantially uniform in all angular positions of said chuck, a third magnetic member extending along the chuck axis with its end radially spaced from the ends of said teeth and terminating adjacent the hub of said pallet element, a stationary coil enclosing said third member, means disposed about said coil and magnetically connecting said second and third magnetic members to complete a magnetic flux circuit through said gap and said pallet element, the reluctance of said flux circuit being varied by the oscillations of the outer ends of the arms of said pallet element relative to said teeth, and means responsive to the variation of said reluctance for indicating the frequency of oscillation of said pallet element.

3. Apparatus for testing a fuze having a generally cylindrical carrier and a magnetic angularly oscillatable pallet element having a hub and arms extending therefrom with said hub mounted on said carrier near one end thereof to oscillate back and forth about the carrier axis, said apparatus comprising a chuck for receiving and holding said carrier with said pallet element thereon, means for rotating said chuck and said carrier held thereby about the axis of said carrier, a stationary first magnetic member projecting along the axis of said chuck and terminating adjacent the hub of said pallet element, a second magnetic member rotatable with said chuck and carrying teeth extending radially inwardly therefrom to a point spaced from said first magnetic member and adjacent the outer end portions of the arms of said pallet element near one limit of the range of oscillation thereof, a stationary third magnetic member cooperating with said second magnetic member to form a gap therewith which remains of uniform reluctance in all positions of said chuck, a stationary coil, means forming a magnetic flux circuit extending through said magnetic members and said teeth, the oscillations of said arms of said pallet element varying the reluctance of the magnetic flux in said circuit, and means connected with said coil for sensing the variation of said flux to indicate the frequency of oscillation of said pallet element.

4. Apparatus for testing the timer of a fuze having a generally cylindrical non-magnetic carrier and an elongated pallet element of magnetic material disposed adjacent one end of said carrier and oscillatable in a plane extending transversely of the carrier axis, said apparatus comprising a chuck for receiving said carrier with said pallet element thereon, two teeth of magnetic material carried by said chuck and projecting radially inwardly therefrom, means for rotating said chuck and the carrier with said pallet element thereon about an axis extending longitudinally of said carrier, means for clamping said carrier in said chuck with said teeth lying along a diametrical plane adjacent one limit position of said pallet element, a relatively stationary casing of magnetic material disposed at the end of said chuck, said casing forming an annular surface opposing and disposed closely adjacent the radially extending outer end portions of said teeth, means cooperating with said casing to form a flux path extending therethrough and through said teeth and said pallet element and including a member projecting from said casing to a point between said teeth and adjacent the center of said pallet element, a coil disposed within said casing and surrounding said last-named member, and means for sensing voltage variations induced in said coil by changes in the reluctance of said flux circuit produced by oscillation of said pallet element.

5. Apparatus for testing a timer having a carrier and a timing part fixed on said carrier and oscillatable back and forth about the axis thereof in a plane extending transverse of such axis, said apparatus comprising a rotatably mounted chuck adapted to receive and to support said carrier, stationary flux circuit means including an annular shell formed of magnetic material, an annular coil operatively mounted within the annular shell, a magnetic core axially mounted within said shell and magnetically coupled thereto and extending through said coil, magnetic elements rotatable with said chuck and magnetically coupled with said stationary flux circuit means to form a magnetic path therewith which extends through said oscillatable element fixed on said carrier, means for sensing changes in the voltage induced in said coil with changes in the position of said oscillatable part relative to said carrier, and means for indicating said voltage changes.

6. Apparatus for measuring the frequency of oscillation of a magnetic element mounted on a carrier to oscillate relative thereto about the axis thereof, said apparatus comprising, in combination, a rotatably mounted chuck adapted to receive and to support said carrier, a stationary carrier including an annular plate member facing said chuck and an annular casing magnetically coupled together, a coil disposed in said annular casing and magnetically coupled thereto, a magnetic core member magnetically coupled to said annular casing and extending through said coil and axially through said annular plate member, magnetic means rotatable with said chuck and magnetically coupled with said annular plate member and with said annular casing and said magnetic core member to form therewith a magnetic flux circuit whose reluctance varies with the periodic changes in the position of said magnetic element relative to said carrier, and means connected with said coil for sensing and for indicating the variation in said reluctance.

7. Apparatus for testing a device having a carrier and a magnetic timing part movable back and forth in an oscillating motion relative to the said carrier, said apparatus comprising a stationary support, means for mounting said carrier on said support, means for moving said carrier relative to said support, a coil on said support, members of magnetic material respectively mounted on said stationary support and on said moving carrier and coacting to provide a magnetic flux circuit extending through said movable magnetic part on said carrier whereby the reluctance of the flux circuit varies with changes in the position of such part relative to said carrier, said movable and stationary magnetic members including means forming opposed closely adjacent surfaces providing in said flux circuit gaps which are substantially uniform reluctance in the different positions of said moving carrier, and means for sensing and for indicating voltage changes in said coil resulting from the changes in the reluctance of said flux circuit caused by the movement of said magnetic part relative to said carrier.

8. In an apparatus for determining the frequency of oscillation of a magnetic element mounted on a carrier, the combination comprising a chuck for rotatably supporting said carrier to turn about its axis and having means thereon providing a magnetic path extending through said element and variable in reluctance in accordance with changes in the position of said element relative to said carrier, a stationary coil disposed adjacent said chuck, a stationary magnetic part cooperating with said chuck to form a magnetic flux circuit extending through said path and having a gap therein which remains of substantially uniform reluctance in all angular positions of said chuck about said axis, means for detecting voltage changes in said coil resulting from variations in the position of said oscillatory element relative to said carrier, and means for indicating said voltage changes.

9. In a mechanism for testing a fuze having an oscillatory magnetic timing element, the combination of a rotary chuck for holding a fuze to be tested, means for rotating said chuck, stationary flux circuit means mounted adjacent said chuck and including a shell formed of magnetic material, a stationary coil disposed within said shell, a magnetic core axially extending through said stationary coil and magnetically coupled with said shell to provide a stationary magnetic flux circuit around said stationary coil, magnetic elements rotatable with said chuck and magnetically coupled with said stationary flux circuit to form a magnetic path therewith which extends through said oscillatory magnetic timing element, said magnetic path having a reluctance which is uniform for a given position of said element during rotation of the chuck but which varies periodically during such rotation with changes in the position of said oscillatory magnetic timing element relative to the chuck, and means for detecting and for indicating changes in the voltage induced in said winding produced by said periodic reluctance changes.

10. Apparatus for testing a device having a magnetic timing element thereon which oscillates periodically back and forth, said apparatus comprising rotatable means for supporting and for rotating said device with said magnetic timing element thereon, stationary flux circuit means including a shell formed of magnetic material, a stationary coil disposed within said shell, a magnetic core extending through said stationary coil and magnetically coupled with said shell to provide a stationary magnetic flux circuit around said stationary coil, magnetic elements rotatable with said rotatable means and magnetically coupled with said stationary flux circuit to form a magnetic path therewith which extends through said magnetic timing element, the reluctance of said magnetic path being changed alternately by oscillation of magnetic timing while said device is rotated, and means for sensing and for indicating the changes in the reluctance of said magnetic path.

References Cited in the file of this patent

UNITED STATES PATENTS

| | | |
|---|---|---|
| 2,343,452 | Gibbs | Mar. 7, 1944 |
| 2,528,534 | Meister | Nov. 7, 1950 |